Dec. 18, 1962 DE WITT McCANN 3,068,958
LADDER
Filed Feb. 6, 1961
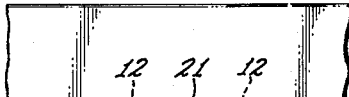
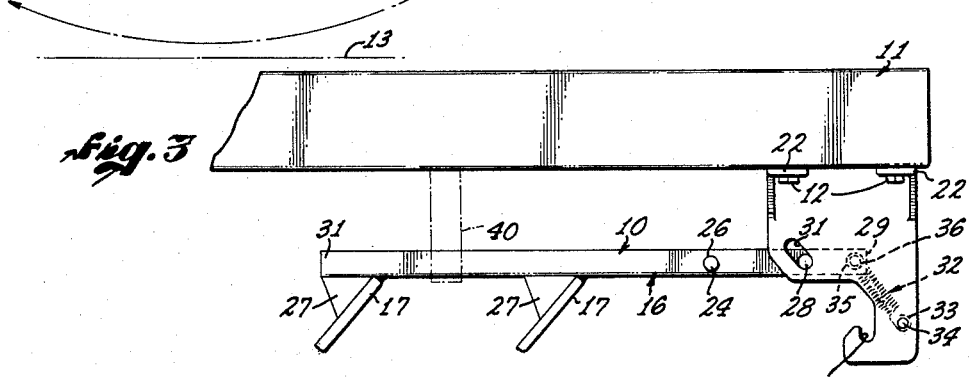
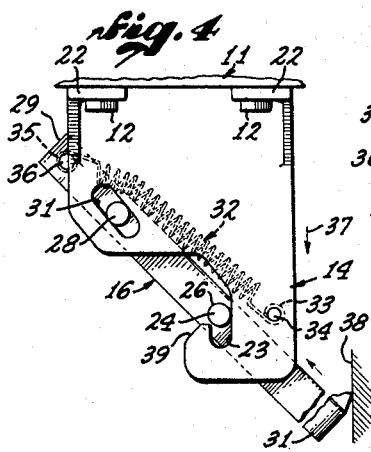
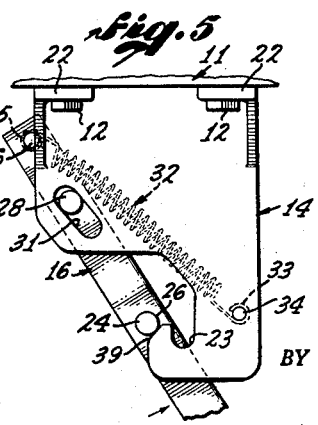
DE WITT MC CANN,
INVENTOR.
BY
PATENT AGENT.

United States Patent Office 3,068,958
Patented Dec. 18, 1962

3,068,958
LADDER
De Witt McCann, 4058 Fairway, Studio City, Calif.; Celia McCann, executrix of said De Witt McCann, deceased
Filed Feb. 6, 1961, Ser. No. 87,447
13 Claims. (Cl. 182—89)

This invention relates to a ladder and more particularly to a foldable ladder securable as to the underside of a platform and selectively positionable into an operative position extending beyond the edge of the platform for facilitating ascension to or descension from the platform and into an inoperative position retracted beneath the platform for non-demounted storage thereof when not in use.

More specifically, this invention provides a new and improved yieldable ladder securable as to the underside of a moveable platform, such as a truck bed, or the like, for facilitating ascension to and descension from the platform during loading and unloading thereof. The ladder provides a bracket adapted to be secured as to the underside of a truck bed and adjacent to the outer edge thereof so as to depend therefrom and an elongated member pivotally supported on the bracket and having a plurality of transverse steps secured thereto. The elongated member is selectively positionable into a rearwardly-extending angular position, relative to the truck bed, with its steps substantially horizontal. The elongated member, in the angular position, is securely, but releasably, locked relative to the bracket to provide firm footing during use thereof and is swingable into a forwardly-extending, substantially horizontal retracted position for storage thereof beneath the platform when not in use. A spring means is operatively associated with the elongated member and the bracket for biasing the elongated member into a locked operative position and into the inoperative position wherein the elongated member is stored underneath the truck bed when not in use.

A further feature of this invention is the provision of means whereby, in the event that the truck is moved in a rearward direction and into contact with an obstacle, such as a wall, post, another vehicle, or the like, the locking means is automatically released, in response to an abutment of the elongated member with the obstacle, to cause the spring means to automatically bias the elongated member into its inoperative and non-obstructing position.

It is to be understood that the ladder of this invention may be secured as to the underside of an immovable platform, such as a loading dock, or the like, for facilitating ascension to and descension therefrom yet which is automatically released for positioning into an inactive and unobstructing position in response to impact thereof with a moveable object, such as a vehicle or the like, to prevent injury thereto or to the object.

This invention is an improvement of the structure contained in my Patent No. 2,544,799, entitled "Yielding Vehicle Step," issued March 13, 1951.

It is therefore among the objects of this invention to provide a new and improved ladder which is removably or permanently securable to an elevated platform and positionable into an operative position for facilitating ascension and descension to and from the platform for facilitating loading or unloading thereof.

It is another object of this invention to provide a new and improved truck ladder which is selectively positionable into an operative position for facilitating access to the platform but which is selectively positionable into an inactive retracted position while still being secured thereto.

A further object of this invention is to provide a new and improved truck ladder of the character described in which the ladder is automatically positioned into its inactive, retracted position in response to contact thereof with an immovable object.

It is another object of this invention to provide a new and improved ladder of the character described which is adapted to be secured as to an immovable platform, such as a loading dock or the like, for facilitating ascension thereto and descension therefrom, which is automatically positioned into an inactive, unobstructing position in response to contact therewith with a movable object.

Yet another object of this invention is to provide a new and improved ladder of the character described which is readily and easily manually positionable into its active and inactive positions yet which is firmly and safely releasably locked in its active position.

A still further object of this invention is to provide a new and improved ladder of the character described which is economical to manufacture and capable of mass production.

Another object of this invention is to provide a new and improved ladder which is compact in construction, and appreciably lighter in weight than present devices intended to accomplish generally similar purposes.

A general object of this invention is to provide a new and improved ladder of the character described which overcomes disadvantages of prior means and methods heretofore employed to accomplish generally similar purposes.

These and other objects of this invention will be more apparent from the following detailed description, drawings and appended claims.

In the drawings:
FIGURE 1 is a side view, in elevation, of a ladder designed and constructed in accordance with this invention and positioned in an operative position relative to a platform;
FIGURE 2 is an end view thereof as viewed from the right side of FIGURE 1;
FIGURE 3 is a side view, in elevation and similar to FIGURE 1, with parts thereof illustrated in a changed position, an inactive storage position;
FIGURE 4 is an enlarged, fragmentary side view thereof, in elevation, illustrating the invention in an operating position; and
FIGURE 5 is a view similar to FIGURE 4 illustrating therein another operating position thereof.

Referring more particularly to the drawings, there is shown, by way of illustration but not of limitation, a ladder designed and constructed in accordance with this invention and generally referred to by the numeral 10. The truck ladder 10 is illustrated as being secured to the underside of a platform 11 which represents any platform which is elevated above a ground level and not having permanent steps, such as a loading platform, a truck bed, or the like. The ladder 10 is permanently or non-permanently secured to the underside of the platform as by a plurality of fasteners, for example, the bolts indicated by the numeral 12.

In the event that the platform 11 is a movable one, such as a truck bed, or a non-movable one, such as a loading dock, the ladder 10 of this invention provides analogous purposes. The ladder 10 may be positioned so as to extend outwardly beyond the edge of the platform to facilitate ascension of a worker from the ground, indicated at 13, to the platform 11 or for descension from the platform to the ground. The ladder 10 may be positioned in an inactive position, while still secured to the platform, wherein the ladder is tucked beneath the platform and does not extend beyond the edge thereof. Further, injury to the ladder is prevented in the event that a truck bed is backed into an immovable object while the ladder is extended, so as to contact the ladder with the object, or a movable object is contacted with the ladder mounted on an immovable platform. The ladder is automatically positioned into an inactive, unobstructing position in response to abutment thereof with the movable or immovable object.

The ladder 10 comprises a bracket 14 forming a support for a rotatable elongated member 16 having one or more steps, indicated by the numeral 17, and removably securable as to the underside of the platform 11 by the fasteners 12 or optionally non-removably secured as by welding, or the like.

The bracket 14 is preferably die cast, or otherwise molded, of a relatively-light, but strong, material, such as aluminum or the like, and includes a pair of substantially parallel, spaced, side walls 18 and 19 joined together as by one or more transverse webs indicated by the numeral 21. A plurality of substantially horizontal ears 22 are secured to or formed integrally with the walls 18 and 19 for mounting the bracket to the platform 11 and through which the fasteners 12 extend.

Each wall 18 and 19 includes a depending hook 23, the hooks 23 being substantially aligned and adapted to receive therein a pin 24 extending transversely through an intermediate portion of the elongated member 16 and having opposing ends 26 extending outwardly therefrom.

The elongated member 16 is preferably formed of a relatively-rigid, light and strong material, such as a formed or extruded U-shaped aluminum section, or the like, which is provided with a gusset 27 for supporting each step 17.

The elongated member 16 includes a second pin 28 extending transversely therethrough and adjacent to an upper end 29 which is opposite to an outer end 31 to which the steps 17 are secured. Opposing ends of the pin 28 extend outwardly from the elongated member 16 and are pivotally supported in substantially aligned angular slots 31 formed in the walls 18 and 19 at an intermediate portion thereof.

A spring means, generally indicated by the numeral 32, is illustrated in the form of a tension spring having one end 33 secured as to a transverse pin 34 formed integrally with or secured to the walls 18 and 19 and its opposite end 35 secured to the end 29 of the elongated member 16 as by a transverse pin 36 secured to the end 29, so as to bias the elongated member 16 to pivot around the axis of the pin 28.

The elongated member 16, in FIGURES 1 and 2, is illustrated as being positioned in an active or operative position, in angular relationship to the platform 11, with its steps 17 in substantially horizontal relationship. In this position, the steps 17 may be used to facilitate ascent to or descent from the platform 11. The elongated member 16 is releasably locked in this position by the engagement of the pin 24 in the hooks 23 with the spring 32 biasing the pin into engagement with the hook. The spring 32 is preferably of substantial strength so as to avoid inadvertent disengagement of the pin 24 from the hooks 23 in response to vibrations or slight impacts as of a foot with the steps 17.

To rotate the elongated member 16 into its inactive position, illustrated in FIGURE 3, wherein the member 16 is positioned substantially parallel to the platform 11, when not in use, the member 16 is manually, linearly moved relative to the bracket 14 so as to disengage the pin 24 from the hooks 23 whereby the spring means 32 biases the elongated member 16 to pivot the end 31 underneath the platform 11 and clear of the outer edge of the platform.

A dominant feature of this invention is the provision for automatically positioning the elongated member 16 into its inactive position in response to contact thereof with a moveable object, if the platform 11 is immovable, or with an immovable object, if the platform 11 is moveable. Contact of the lower end 31, or the lowermost step 17 thereat, with an immovable object, if a moveable platform 11 is moved as by a backing up by the truck, causes the elongated member 16 to move substantially linearly, with the pin 28 riding upwardly in the slot 31 and the pin 24 riding outwardly of the hook 23 and disengaging therewith, as illustrated in FIGURE 4. In actual practice, it has been found that upon impact of the end 31 with an immovable object when the platform 11 is a truck bed, the resultant force causes the platform 11 to lower, as indicated by the arrowed line 37, to thereby remove the hooks 23 from the pin 24 to disengage the pin 24 from the hooks 23 and permit the spring means 32 to automatically pivot the elongated member away from the obstruction indicated at 38 in FIGURE 4. A similar action is resulted when the platform 11 is an immovable platform, such as a loading dock, and an impact is directed against the ladder portion 16 as by a movable object, such as a vehicle, wherein the pin 24 is disengaged from the hooks 23 to permit the spring 32 to rotate the elongated member 16 into its inactive, unobstructing position of FIGURE 3.

To reset the elongated member 16 for ladder use, the member 16 is manually pivoted rearwardly, to the right as viewed in the drawings, into its angular, operative position. A cam surface 39 is formed adjacent to each hook portion 23 so as to cam the pin 24 over the hook whereupon the spring 32 biases the pin 24 into the hook 23 to lock the elongated member 16 into the operative position illustrated in FIGURE 1. FIGURE 5 illustrates such resetting of the elongated member 16, whereby the pin 24 is shown as being in contact with the cam surface 39 immediately prior to bias of the pin 24 into the hooks 23. The slots 31 are preferably of sufficient length so as to allow sufficient movement of the pin 28 therein during the various movements of the elongated member 16.

If desired, a stop or catch, indicated in FIGURE 3 by the broken lines 40, may be provided to releaseably support the member 16 in its horizontal position so as to prevent excessive rattling or swinging of the member as a result of motion of the platform.

While the instant invention has been shown and is described herein in what is conceived to be the most practical and preferred embodiment, it is recognized that departures may be made therefrom in the scope of the invention which is therefore not to be limited to the details disclosed herein, but is to be afforded the full scope of the claims.

What I claim as new and desire to secure by Letters Patent is:

1. A freely yieldable ladder, comprising:
    bracket means adapted to be secured to the underside of a platform and adjacent to an outer edge thereof so as to depend therefrom and in underlying relationship thereto;
    an elongated member having ends pivotally supported on said bracket means adjacent one of said ends and having at least one transverse step fixed to an opposite of its ends, said elongated member being positionable into an extended angular position relative to the platform and extending outwardly beyond said outer edge thereof with said step substantially horizontal and into a retracted, substantially horizontal position relative to the platform and underlying said bracket means;
    means releasably locking said elongated member relative to said bracket means in said extended angular position; and
    spring means biasing said elongated member into said angular position for locking relationship of said releasable locking means and to pivot into said horizontal position in response to release of said locking means, said elongated member being movable inwardly, towards said one of said ends thereof and said bracket means and in a direction contrary to the bias of said spring means in response to a force applied to the elongated member which has a resultant substantially parallel thereto and in said one direction so as to release said locking means, whereby said elongated member is biased by said spring means to pivot into its horizontal position underlying the platform.

2. A freely yieldable ladder for a platform, comprising:

bracket means adapted to be secured to the underside of the platform and adjacent to an outer edge thereof so as to depend therefrom in underlying relationship thereto;

an elongated member having a pin and slot connection adjacent one of its ends with said bracket means for pivotally supporting said elongated member on said bracket means, said elongated member having at least one transverse step secured to an opposite end thereof and being positionable into an outwardly-extending angular position relative to the platform and beyond said outer edge thereof with steps substantially horizontal, and into a retracted horizontal position substantially parallel to the platform and underlying the platform;

yieldable holding means for holding said elongated member relative to said bracket means in said outwardly-extending angular position; and spring means biasing said elongated member into locked relationship with said bracket in said outwardly-extending angular position and to pivot into said retracted horizontal position in response to release of said holding means, said pin of said elongated member being movable in said slot in response to a force applied to said elongated member in a direction towards said bracket and opposed to the force of bias of the spring means for disengaging said yieldable holding means.

3. A freely yieldable ladder, comprising:

bracket means securable to the underside of an elevated movable platform and adjacent to an outer edge thereof;

an elongated member pivotally supported on said bracket means and having at least one transverse step secured thereto, said elongated member being selectively positionable into an outwardly-extending, angular position relative to the platform and beyond said outer edge thereof with said steps substantially horizontal and into an inwardly-extending, horizontal position underlying said bracket and said platform and substantially parallel thereto;

means releasably locking said elongated member in said angular position relative to said bracket means, said locking means being responsive to a force resultant of abutment of said elongated member and an outer immovable obstruction during movement of said movable platform for releasing said locking means, said force resultant being in an inwardly-extending direction, towards said bracket means while said elongated member is in its outwardly-extending position; and spring means holding said elongated member in said angular position and automatically biasing said elongated member to pivot into said horizontal position in response to release of said releasable locking means.

4. A ladder as defined in claim 3, wherein said locking means includes hook means on said bracket and transverse pin means on said elongated member, said pin means being biased into engagement with said hook means by said spring means for releasably locking said elongated member relative to said bracket means when in said outwardly-extending angular position.

5. A ladder as defined in claim 4, wherein said elongated member is linearly movable relative to said bracket means and in a direction contrary to the bias of said spring means and said pin means is disengaged by said hook means in response to said linear movement so as to release said elongated member for bias by said spring means to pivot into said horizontal position.

6. A ladder as defined in claim 5, wherein said elongated member is manually pivotable from its horizontal position to said angular position and including cam means on said bracket means and adjacent to said releasable locking means for guiding said pin means of said elongated member into locking engagement with said hook means.

7. A freely yieldable ladder for a platform, comprising:

bracket means securable to the underside of an elevated, immovable platform and adjacent to an outer edge thereof;

an elongated member pivotally supported on said bracket means and having at least one transverse step secured thereto, said elongated member being selectively positionable into an outwardly-extending, angular position relative to the platform and outwardly beyond said edge thereof wherein said step is substantially horizontal and into a retracted, inwardly-extending, horizontal position underlying said bracket and the platform and substantially parallel thereto;

means releasably locking said elongated member into said angular position relative to said bracket means, said locking means being responsive to a force resultant of abutment of said elongated member with an outer movable obstruction during movement of said movable object to move said elongated member in a linear direction substantially parallel thereto and inwardly towards said bracket means for releasing said locking means; and spring means biasing said elongated member into said locked relationship of said releasable locking means in said angular position and to pivot into said horizontal position in response to release of said locking means.

8. A ladder as defined in claim 7, wherein said locking means includes hook means on said bracket and transverse pin means on said elongated member, said pin means being biased into engagement with said hook means by said spring means for releasably locking said elongated member relative to said bracket means and said pin means being biased out of engagement with said hook means against the bias of said spring means in response to movement of said elongated member in a linear direction substantially parallel thereto for releasing said locking means.

9. A ladder as defined in claim 8, wherein said elongated member is linearly movable relative to said bracket means and in a direction contrary to the bias of said spring means and said pin means is disengaged by said hook means in response to said linear movement so as to release said elongated member for bias by said spring means to pivot into said horizontal position.

10. A ladder as defined in claim 9, wherein said elongated member is manually pivotable from its horizontal position to said angular position and including cam means on said bracket means and adjacent to said releasable locking means for guiding said pin means of said elongated member into engagement with said hook means.

11. A ladder as defined in claim 10, including holding means releasably holding said elongated member in said retracted horizontal position.

12. A freely yieldable and extendable ladder for a platform, comprising:

bracket means adapted to be secured to the underside of the platform and adjacent to an outer edge thereof so as to underlie the platform;

an elongated member having ends pivotally supported adjacent to one of its ends on said bracket means and having at least one transverse step fixed to an opposite of its ends, said elongated member being positionable into an active, angular position relative to said bracket and extending outwardly beyond the bracket and the edge of the platform with said step substantially horizontal, and into an inactive position substantially horizontal relative to the bracket and the platform so as to underlie the platform;

yieldable holding means for holding said elongated member in said active position, said holding means comprising hook means on said bracket means and a transverse pin on said elongated member and engageable with said hook means in said active position; and spring means normally biasing said holding means to yieldably hold said elongated member in said active position and for biasing said elongated member to pivot into said inactive position in response to release of said yieldable holding means;

said yieldable holding means being freely yieldable to release said pin of said elongated member from said hook means of said bracket means whereby said spring means is effective to pivot said elongated member into said inactive position in response to engagement of said opposite end of said elongated member with an outward obstruction, when in said active position, to produce a force resultant to move said elongated member in a direction towards said bracket means.

13. A freely yieldable and extendable ladder, comprising:

bracket means adapted to be secured to the underside of the platform and adjacent an outer edge thereof so as to underlie the platform, said bracket means having depending hook means adjacent its outer edge and having an upwardly-facing entry and a slot angularly disposed in upwardly-spaced relationship to said hook means;

an elongated member having ends and pivotally supported adjacent one of its ends in said slot of said bracket means and having at least one transverse step fixed to an opposite of its ends, said elongated member being positionable into an active, angular position relative to said bracket means and with said opposite end thereof extending outwardly beyond said bracket and said step substantially horizontal and into an inactive position substantially horizontal relative to the platform so as to underlie the platform;

yieldable holding means for holding said elongated member in said active position, said holding means comprising a transverse pin on said elongated member intermediate its ends and engageable with said hook means when said elongated member is in its active position to hold said member relative said bracket means and disengageable from said hook means for release thereof in response to inward movement of said elongated member in a direction towards said bracket means; and spring means normally biasing said transverse pin into holding engagement with said hook means when said elongated member is in its active position and for biasing said elongated member to pivot around its pivotal support and into said inactive position in response to a force resultant in movement of said elongated member in said inward direction towards said bracket means.

References Cited in the file of this patent
UNITED STATES PATENTS

| | | |
|---|---|---|
| 1,762,052 | Dodds | June 3, 1930 |
| 2,670,968 | Duffy | Mar. 2, 1954 |
| 2,738,987 | McDonald | Mar. 20, 1956 |
| 2,764,422 | McDonald | Sept. 25, 1956 |

FOREIGN PATENTS

| | | |
|---|---|---|
| 530,289 | Italy | July 6, 1955 |